W. L. BUCKELS.
AUTOMOBILE SPRING WHEEL.
APPLICATION FILED MAY 4, 1918.

1,419,811.

Patented June 13, 1922.
2 SHEETS—SHEET 1.

Witnesses
Inventor
W. L. Buckels

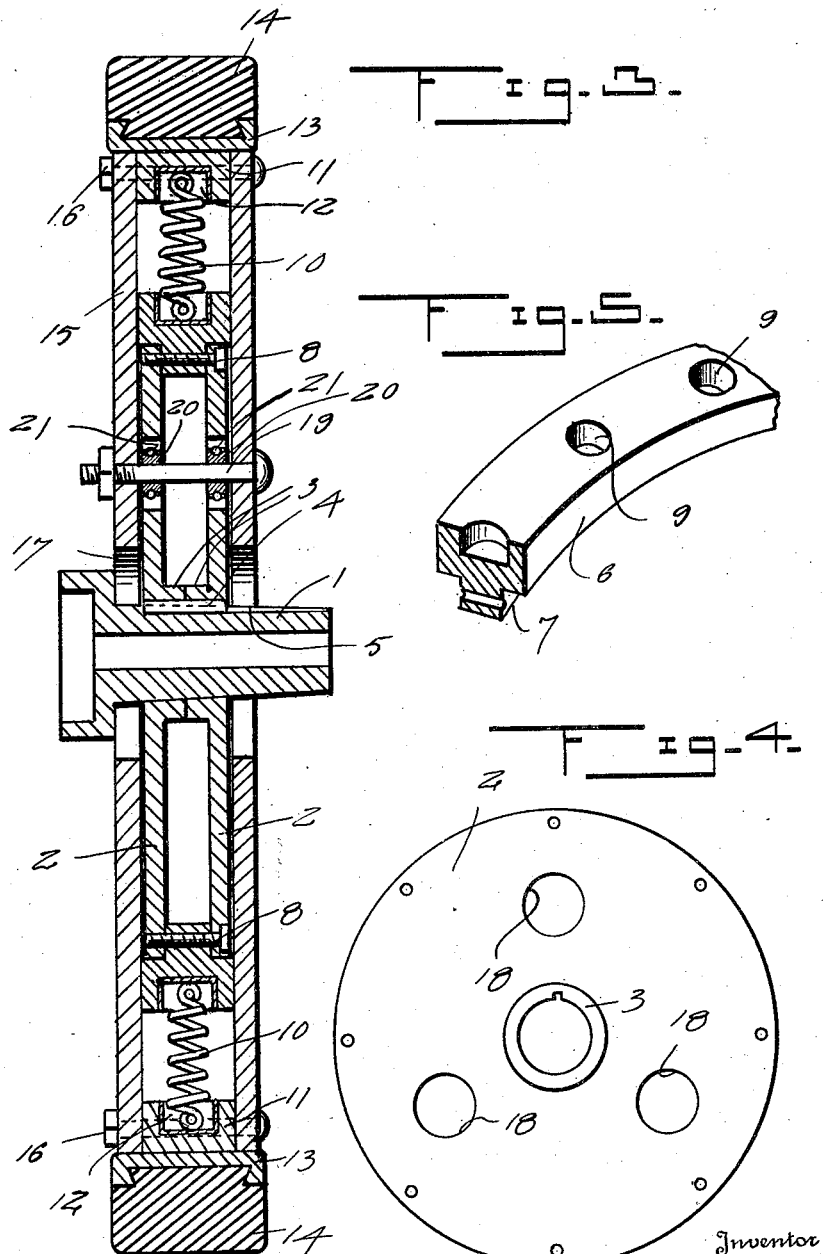

UNITED STATES PATENT OFFICE.

WILLIAM L. BUCKELS, OF FORT PAYNE, ALABAMA.

AUTOMOBILE SPRING WHEEL.

1,419,811.  Specification of Letters Patent.  Patented June 13, 1922.

Application filed May 4, 1918. Serial No. 232,608.

*To all whom it may concern:*

Be it known that I, WILLIAM L. BUCKELS, a citizen of the United States, residing at Fort Payne, in the county of Dekalb and State of Alabama, have invented certain new and useful Improvements in Automobile Spring Wheels; and I do hereby declare the following to be a full, clear, and exact description of the invention, such as will enable others skilled in the art to which it appertains to make and use the same.

This invention relates to improvements in spring wheels especially adapted for motor vehicles and has for one of its objects the provision of a device of this character which will produce a smooth riding wheel and thereby obviate the use of penumatic tires which are expensive owing to punctures and blow outs that are frequent in tires of this character.

Another object of this invention is the provision of outer and inner rims to the wheel and which outer rim is cushionly mounted on the inner rim so that all shocks and jars will be absorbed, thereby providing a smooth riding device.

A further object of this invention is the provision of a spring wheel of the above stated character, which shall be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawings, in which:—

Figure 1:
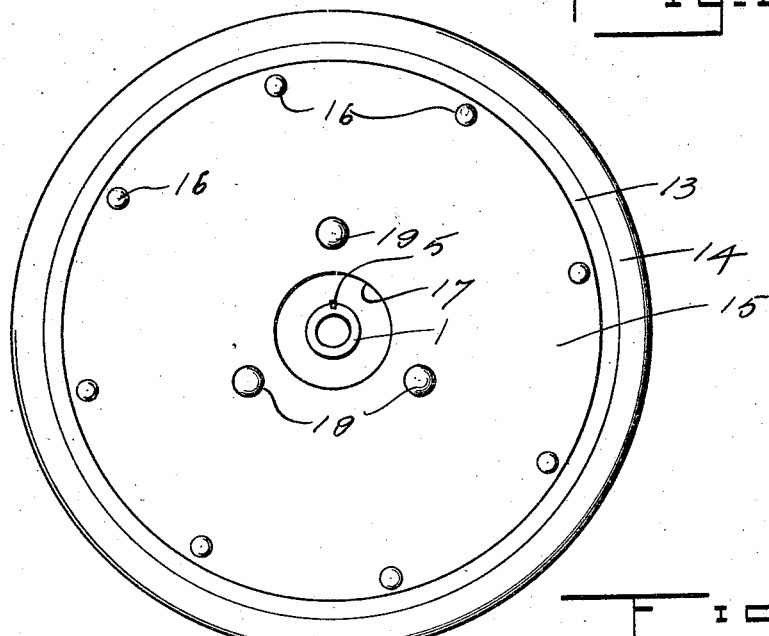
Figure 2:
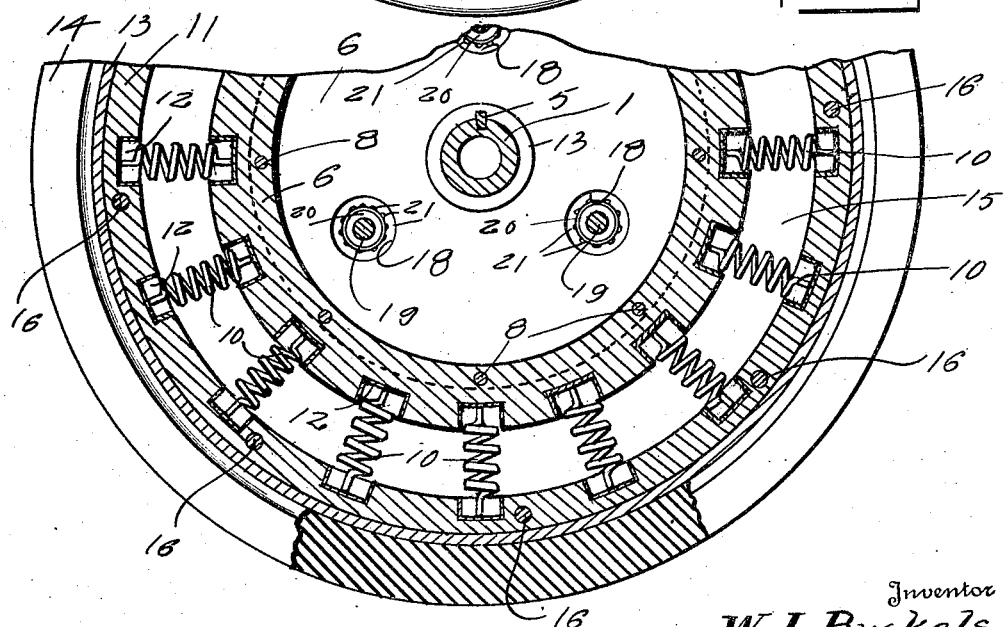

Figure 1 is a side elevation of a spring wheel constructed in accordance with my invention, Figure 2 is a fragmentary longitudinal sectional view of the same, Figure 3 is a transverse sectional view illustrating the manner of cushionly mounting the outer rim upon the inner rim, Figure 4 is a plan view of an inner plate, and Figure 5 is a fragmentary perspective view of the inner rim.

Referring in detail to the drawings, the numeral 1 indicates a boxing or hub on which is mounted a pair of relatively spaced circular inner plates 2 having alined centrally arranged openings to receive the hub or boxing 1. Inwardly directed annular flanges 3 are formed upon the plates 2 about the central opening thereof and are adapted to abut each other to form a continuous bearing surface of the plates upon the boxing or hub and are provided with alined slots to receive a key 4 that fits within a slot 5 of the hub or boxing 1 so that the plates are secured thereto for rotation therewith.

A circular inner rim 6 has formed upon its inner face a flange 7 that is adapted to be disposed between the plates 2 so that the outer rim rests upon the periphery of said plates. The flange 7 is secured to the plate by means of a plurality of bolts 8. The inner rim 6 has a plurality of spaced sockets 9 formed in its outer face for receiving the inner ends of coil springs 10. The coil springs 10 have mounted upon their ends protecting elements which fit within the sockets 9 and aid in retaining the springs in their sockets. An outer rim 11 has a plurality of spaced sockets 12 that receive the outer ends of the springs to cushionly support the outer rim in spaced relation to the inner rim 6. The outer rim 11 has mounted thereon the usual tire rim 13 carrying a solid tire 14. This tire may be constructed of any material suitable for the purpose.

A pair of outer plates 15 are secured to each side face of the outer rim 11 by means of bolts 16 and are provided with a large central opening 17 that receive the hub or boxing 1 and are of such a size that the walls thereof are spaced away from the hub or boxing 1 so that the outer rim 11 may move in the direction of the inner rim to compress the springs 10 when passing over uneven ground to form a cushioning means to the wheel. The inner plates 2 have circular openings 18 of a considerable size to receive bolts 19 carried by the outer plates whereby the outer plates are connected together and are held in close relation to the inner plates and which permit the outer plates to have movement in relation to the inner plates. The bolts 19 have mounted thereon members 20 in which are mounted ball bearings 21 which are adapted to engage the walls of the openings 18 when undue strain is placed on the wheel such as when the wheel is employed as a driving wheel. The openings 18 receiving the bolts 19 also prevent the outer rim from having circumferential movement over a given point of the inner rim thereby preventing the springs 10 from being unseated from their respective sockets.

While I have shown and described the preferred embodiment of my invention, it will be understood that minor changes in construction, combination and arrangement of parts may be made without departing from the spirit and scope of the invention as claimed.

What I claim as new is:—

1. A spring wheel comprising a hub, inner spaced plates having centrally arranged openings to receive the hub, flanges formed on the opposing faces and about the openings of said plates and keyed to said hub, an inner rim resting on the peripheries of the plates and having a portion projecting between said plates and secured to the latter, an outer wheel structure, and cushion means between said outer wheel structure and the inner rim.

2. A spring wheel comprising a hub, inner plates secured to the hub and having alined openings, an inner rim secured to the plates, an outer tire supporting rim, cushion means between said rims, outer plates secured to the outer rim and receiving the inner plates, bolts connecting the outer plates and extending through the openings and of a diameter smaller than the diameter of the openings, and anti-friction elements mounted on said bolts and adapted to move in contact with the walls of the openings to establish driving connections between said inner and outer plates.

In testimony whereof I affix my signature in presence of two witnesses.

WILLIAM L. BUCKELS.

Witnesses:
H. P. EMMETTS,
A. O. MURDOCK.